(12) United States Patent
Taylor et al.

(10) Patent No.: US 11,125,561 B2
(45) Date of Patent: Sep. 21, 2021

(54) STEERING ASSIST

(71) Applicant: SONY INTERACTIVE ENTERTAINMENT INC., Tokyo (JP)

(72) Inventors: Michael Taylor, San Mateo, CA (US); Dennis Dale Castleman, Fremont, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 100 days.

(21) Appl. No.: 15/394,285

(22) Filed: Dec. 29, 2016

(65) Prior Publication Data

US 2018/0094931 A1  Apr. 5, 2018

Related U.S. Application Data

(60) Provisional application No. 62/402,752, filed on Sep. 30, 2016.

(51) Int. Cl.
*G01C 21/00* (2006.01)
*B64C 39/02* (2006.01)
*G08G 5/04* (2006.01)
*G08G 5/00* (2006.01)
*G05D 1/00* (2006.01)

(52) U.S. Cl.
CPC .......... *G01C 21/00* (2013.01); *B64C 39/024* (2013.01); *G05D 1/0044* (2013.01); *G08G 5/0021* (2013.01); *G08G 5/0069* (2013.01); *G08G 5/0086* (2013.01); *G08G 5/045* (2013.01)

(58) Field of Classification Search
None
See application file for complete search history.

(56) References Cited

U.S. PATENT DOCUMENTS 3,279,863 A   10/1966   Zuppiger
3,367,658 A   2/1968    Bayha
6,021,646 A   2/2000    Burley et al.
(Continued)

FOREIGN PATENT DOCUMENTS

WO   WO 2018/063594   4/2018

OTHER PUBLICATIONS

Williams, Elliot; "Real-life Space Invaders with Drones and Lasers," Hackaday, Sep. 19, 2016.
(Continued)

*Primary Examiner* — Jonathan M Dager
*Assistant Examiner* — Garrett F Evans
(74) *Attorney, Agent, or Firm* — Polsinelli LLP

(57) ABSTRACT

A steering assist system for an unmanned aerial vehicle (UAV) receives physical space data for a flight area, and creates a virtual world model to represent the flight area by mapping the physical space data with a physics engine. The steering assist system creates a virtual UAV model to represent the UAV in the virtual world model. The steering assist system determines capability parameters for the UAV, and receives flight data for the UAV. The steering assist system determines a predicted trajectory for the virtual UAV model within the virtual world model, based on the capability parameters and flight data for the UAV. The steering assist system determines a navigation suggestion for the UAV based on the predicted trajectory and capability parameters for the UAV, and displays the navigation suggestion.

23 Claims, 5 Drawing Sheets

(56) References Cited

U.S. PATENT DOCUMENTS

| | | |
|---|---|---|
| 6,075,924 A | 6/2000 | Will |
| 7,912,742 B2 | 3/2011 | Trautman |
| 7,975,774 B2 | 7/2011 | Akcasu |
| 7,988,154 B1 | 8/2011 | Regan, Jr. |
| 8,025,293 B1 | 9/2011 | Crawford et al. |
| 8,909,391 B1 | 12/2014 | Peeters et al. |
| 9,061,102 B2 | 6/2015 | Levien et al. |
| 9,442,485 B1 | 9/2016 | McDermott et al. |
| 9,605,926 B1 | 3/2017 | Means et al. |
| 9,927,812 B2 | 3/2018 | Wang et al. |
| 10,062,292 B2 | 8/2018 | Blomberg et al. |
| 10,067,736 B2 | 9/2018 | Taylor et al. |
| 10,269,257 B1 | 4/2019 | Gohl et al. |
| 10,336,469 B2 | 7/2019 | Mallinson |
| 10,357,709 B2 | 7/2019 | Mallinson |
| 10,377,484 B2 | 8/2019 | Taylor |
| 10,410,320 B2 | 9/2019 | Taylor |
| 10,416,669 B2 | 9/2019 | Rico |
| 10,500,487 B2 | 12/2019 | Gutierrez et al. |
| 10,540,746 B2 | 1/2020 | Taylor |
| 10,679,511 B2 | 6/2020 | Kikuchi |
| 10,692,174 B2 | 6/2020 | Taylor |
| 10,850,838 B2 | 12/2020 | Castleman et al. |
| 2003/0102016 A1 | 6/2003 | Bouchard |
| 2003/0152892 A1 | 8/2003 | Huang et al. |
| 2004/0115593 A1 | 6/2004 | Hatlestad et al. |
| 2005/0004723 A1 | 1/2005 | Duggan et al. |
| 2006/0095262 A1 | 5/2006 | Danielli |
| 2006/0169508 A1 | 8/2006 | Trojahn |
| 2006/0238877 A1 | 10/2006 | Ashkenazi et al. |
| 2007/0061116 A1 | 3/2007 | Bush |
| 2007/0102876 A1 | 5/2007 | Giegerich et al. |
| 2008/0073839 A1 | 3/2008 | Nally |
| 2008/0093796 A1 | 4/2008 | Narus et al. |
| 2008/0144884 A1 | 6/2008 | Habibi |
| 2008/0154447 A1 | 6/2008 | Spinelli |
| 2008/0221745 A1 | 9/2008 | Diamandis et al. |
| 2008/0240448 A1 | 10/2008 | Gustafsson et al. |
| 2009/0005167 A1 | 1/2009 | Arrasvuori et al. |
| 2009/0076665 A1 | 3/2009 | Hoisington et al. |
| 2009/0087029 A1 | 4/2009 | Coleman et al. |
| 2009/0118896 A1 | 5/2009 | Gustafsson |
| 2009/0125163 A1 | 5/2009 | Duggan et al. |
| 2009/0187389 A1 | 7/2009 | Dobbins et al. |
| 2010/0017114 A1* | 1/2010 | Tehan ............... G05D 1/0646 701/423 |
| 2010/0083038 A1 | 4/2010 | Pierce et al. |
| 2010/0096491 A1 | 4/2010 | Whitelaw et al. |
| 2010/0121574 A1 | 5/2010 | Ariyur et al. |
| 2010/0228468 A1 | 9/2010 | D'Angelo |
| 2010/0305724 A1 | 12/2010 | Fry et al. |
| 2011/0102459 A1 | 5/2011 | Hall |
| 2011/0106339 A1 | 5/2011 | Phillips et al. |
| 2011/0184590 A1 | 7/2011 | Duggan et al. |
| 2012/0035799 A1 | 2/2012 | Ehrmann |
| 2012/0188078 A1 | 7/2012 | Soles et al. |
| 2012/0206452 A1 | 8/2012 | Geisner et al. |
| 2012/0212399 A1 | 8/2012 | Border et al. |
| 2013/0236040 A1 | 9/2013 | Crawford et al. |
| 2013/0328927 A1 | 12/2013 | Mount et al. |
| 2013/0345910 A1 | 12/2013 | Kerho et al. |
| 2014/0018979 A1 | 1/2014 | Goossen et al. |
| 2014/0316616 A1* | 10/2014 | Kugelmass ............ G05D 1/101 701/8 |
| 2014/0324253 A1 | 10/2014 | Duggan et al. |
| 2014/0356670 A1 | 12/2014 | Haug et al. |
| 2015/0063610 A1 | 3/2015 | Mossner |
| 2015/0135144 A1 | 5/2015 | Kim |
| 2015/0141100 A1 | 5/2015 | Carter |
| 2015/0209659 A1 | 7/2015 | Barr et al. |
| 2015/0323931 A1 | 11/2015 | Downey et al. |
| 2015/0346722 A1 | 12/2015 | Herz et al. |
| 2015/0370250 A1 | 12/2015 | Bachrach et al. |
| 2016/0035224 A1 | 2/2016 | Yang et al. |
| 2016/0078759 A1 | 3/2016 | Nerayoff et al. |
| 2016/0082597 A1 | 3/2016 | Gorshechnikov et al. |
| 2016/0091894 A1 | 3/2016 | Zhang et al. |
| 2016/0111006 A1* | 4/2016 | Srivastava ........... G08G 5/0026 701/3 |
| 2016/0117931 A1* | 4/2016 | Chan ................... G08G 5/0043 701/120 |
| 2016/0144734 A1 | 5/2016 | Wang et al. |
| 2016/0205654 A1 | 7/2016 | Robinson |
| 2016/0217698 A1 | 7/2016 | Liu et al. |
| 2016/0240087 A1* | 8/2016 | Kube .................. G05D 1/0022 |
| 2016/0246474 A1 | 8/2016 | Shuster |
| 2016/0253908 A1 | 9/2016 | Chambers et al. |
| 2016/0257001 A1 | 9/2016 | Blasdel et al. |
| 2016/0291593 A1 | 10/2016 | Hammond et al. |
| 2016/0292924 A1 | 10/2016 | Balachandreswaran et al. |
| 2016/0299506 A1* | 10/2016 | Bruggeman ........... B64D 31/06 |
| 2016/0307447 A1 | 10/2016 | Johnson et al. |
| 2016/0327950 A1 | 11/2016 | Bachrach et al. |
| 2017/0039859 A1* | 2/2017 | Hu ....................... G08G 5/0034 |
| 2017/0053169 A1 | 2/2017 | Cuban et al. |
| 2017/0061813 A1 | 3/2017 | Tao et al. |
| 2017/0069214 A1* | 3/2017 | Dupray ............... G08G 5/0013 |
| 2017/0098947 A1 | 4/2017 | Wolski |
| 2017/0116723 A1 | 4/2017 | Aughey |
| 2017/0158353 A1 | 6/2017 | Schmick |
| 2017/0177937 A1 | 6/2017 | Harmsen et al. |
| 2017/0244775 A1 | 8/2017 | Ha et al. |
| 2017/0251323 A1 | 8/2017 | Jo et al. |
| 2017/0283090 A1 | 10/2017 | Miller et al. |
| 2017/0295446 A1 | 10/2017 | Thagadur |
| 2017/0372617 A1 | 12/2017 | Bruno et al. |
| 2018/0027772 A1 | 2/2018 | Gordon et al. |
| 2018/0039262 A1 | 2/2018 | Fox et al. |
| 2018/0046187 A1 | 2/2018 | Martirosyan et al. |
| 2018/0046560 A1 | 2/2018 | Gillies et al. |
| 2018/0093171 A1 | 4/2018 | Mallinson |
| 2018/0093768 A1 | 4/2018 | Castleman |
| 2018/0093781 A1 | 4/2018 | Mallinson |
| 2018/0095433 A1 | 4/2018 | Rico |
| 2018/0095461 A1 | 4/2018 | Taylor |
| 2018/0095463 A1 | 4/2018 | Castleman |
| 2018/0095714 A1 | 4/2018 | Taylor |
| 2018/0096455 A1 | 4/2018 | Taylor |
| 2018/0096611 A1 | 4/2018 | Kikuchi |
| 2018/0098052 A1 | 4/2018 | Black |
| 2018/0144525 A1 | 5/2018 | Gutierrez et al. |
| 2018/0213359 A1 | 7/2018 | Reinhardt et al. |
| 2018/0246529 A1 | 8/2018 | Hu et al. |
| 2019/0156563 A1 | 5/2019 | Wada |
| 2019/0156573 A1 | 5/2019 | Palos et al. |
| 2019/0311548 A1 | 10/2019 | Wang et al. |
| 2020/0372815 A1 | 11/2020 | Kikuchi |
| 2020/0394754 A1 | 12/2020 | Taylor |

OTHER PUBLICATIONS

U.S. Appl. No. 15/394,473, Dennis Castleman, UAV Battery Form Factor and Insertion/Ejection Methodologies, filed Dec. 29, 2016.
U.S. Appl. No. 15/394,313, Michael Taylor, Proximity Based Noise and Chat, filed Dec. 29, 2016.
U.S. Appl. No. 15/711,695, Dominic S. Mallinson, Unmanned Aerial Vehicle Movement via Environmental Airflow, filed Sep. 21, 2017.
U.S. Appl. No. 15/711,961, Dominic S. Mallinson, Unmanned Aerial Vehicle Movement via Environmental Interactions, filed Sep. 21, 2017.
PCT Application No. PCT/US2017/048064 International Search Report and Written Opinion dated Nov. 7, 2017.
U.S. Appl. No. 15/394,313 Office Action dated Oct. 18, 2017.
U.S. Appl. No. 15/394,391 Office Action dated Feb. 23, 2018.
U.S. Appl. No. 15/393,855 Office Action dated May 16, 2018.
U.S. Appl. No. 16/121,441, Michael Taylor, Proximity Based Noise and Chat, filed Sep. 4, 2018.
U.S. Appl. No. 15/394,391 Office Action dated Aug. 24, 2018.
U.S. Appl. No. 15/394,329 Office Action dated Aug. 7, 2018.
U.S. Appl. No. 15/394,267 Office Action dated Aug. 24, 2018.

(56) References Cited

OTHER PUBLICATIONS

U.S. Appl. No. 15/393,855 Final Office Action dated Oct. 21, 2018.
U.S. Appl. No. 15/711,695 Office Action dated Oct. 5, 2018.
U.S. Appl. No. 15/711,961 Office Action dated Oct. 5, 2018.
Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.
U.S. Appl. No. 16/121,441 Final Office Action dated Sep. 6, 2019.
U.S. Appl. No. 15/394,473 Office Action dated Jun. 10, 2019.
U.S. Appl. No. 16/121,441 Office Action dated Feb. 19, 2020.
U.S. Appl. No. 16/909,837, Michael Taylor, Course Profiling and Sharing, filed Jun. 23, 2020.
U.S. Appl. No. 16/896,480, Megumi Kikuchi, Collision Detection and Avoidance, filed Jun. 9, 2020.
U.S. Appl. No. 16/121,441 Office Action dated Feb. 1, 2021.
Kang et al.; "HRTF Measurement and Its Application for 3-D Sound Localization"; copyright 1997. 6 pages.
OpenCV Modules and Introduction, retrieved from https://web.archive.org/web/20151224212423if_/https://docs.opencv.org/3.1.0/#gsc.tab=0 and publicly available on or before Dec. 24, 2015; 7 pages.
U.S. Appl. No. 16/896,480 Office Action dated Jun. 17, 2021.
U.S. Appl. No. 16/121,441 Final Office Action dated Oct. 5, 2020.

\* cited by examiner

STEERING ASSIST

CROSS-REFERENCE TO RELATED APPLICATION

This application claims the benefit of U.S. Provisional Patent Application Ser. No. 62/402,752 entitled "STEERING ASSIST", filed Sep. 30, 2016. The aforementioned application is herein incorporated by reference in its entirety.

This application is related to U.S. Provisional Patent Application Ser. No. 62/402,747 entitled "COLLISION DETECTION AND AVOIDANCE", filed Sep. 30, 2016, and U.S. Provisional Patent Application Ser. No. 62/402,737 entitled "REMOTE CONTROLLED OBJECT MACRO AND AUTOPILOT SYSTEM", filed Sep. 30, 2016, all of which are incorporated herein by reference.

BACKGROUND OF THE INVENTION

Field of the Invention

This application relates to remote controlled piloting, and more particularly to a system and method for assisted steering for unmanned aerial vehicles.

Description of the Related Art

An unmanned aerial vehicle (UAV), commonly known as a drone or quadricopter, or by several other names, is an aircraft without a human pilot aboard. The flight of UAVs may operate with various degrees of autonomy: either under remote control by a human operator, or fully or intermittently autonomously, by onboard computers.

Drones may be used for racing games or competition that consist in following a path that is defined like a slalom by single or double gates or posts, and by a finish line. In order to win the race, it is essential to fly fast. And in order to achieve the fastest time, it is necessary to fly at the highest speed while conserving a maximum amount of kinetic energy during turns. To optimally navigate a drone racing course, a pilot may need to fly the drone along a very specific flight path or racing line.

Piloting a drone require the user to be skilled as the pilot must use several different controls in combination in order to operate the drone correctly. In addition, drones are often flown in the vicinity of various natural and manmade obstacles, of which the drones may crash into.

Drones are both expensive and fragile. A collision, even at low speeds, can cause serious damage or complete destruction to the drone, from the initial impact or from the subsequent impact with the ground. Even an experienced pilot, when piloting the drone at a high speed, may make piloting mistakes that may cost the user seconds in a race or damage to the drone. As such, users may benefit from steering assistance when piloting drones.

SUMMARY OF THE PRESENTLY CLAIMED INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for steering assist for an unmanned aerial vehicle (UAV).

In an aspect, a steering assist system for an unmanned aerial vehicle (UAV) receives physical space data for a flight area, and creates a virtual world model to represent the flight area by mapping the physical space data with a physics engine. The steering assist system creates a virtual UAV model to represent the UAV in the virtual world model. The steering assist system determines capability parameters for the UAV, and receives flight data for the UAV. The steering assist system determines a predicted trajectory for the virtual UAV model within the virtual world model, based on the capability parameters and flight data for the UAV. The steering assist system determines a navigation suggestion for the UAV based on the predicted trajectory and capability parameters for the UAV, and displays the navigation suggestion.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for assisted steering for unmanned aerial vehicles, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
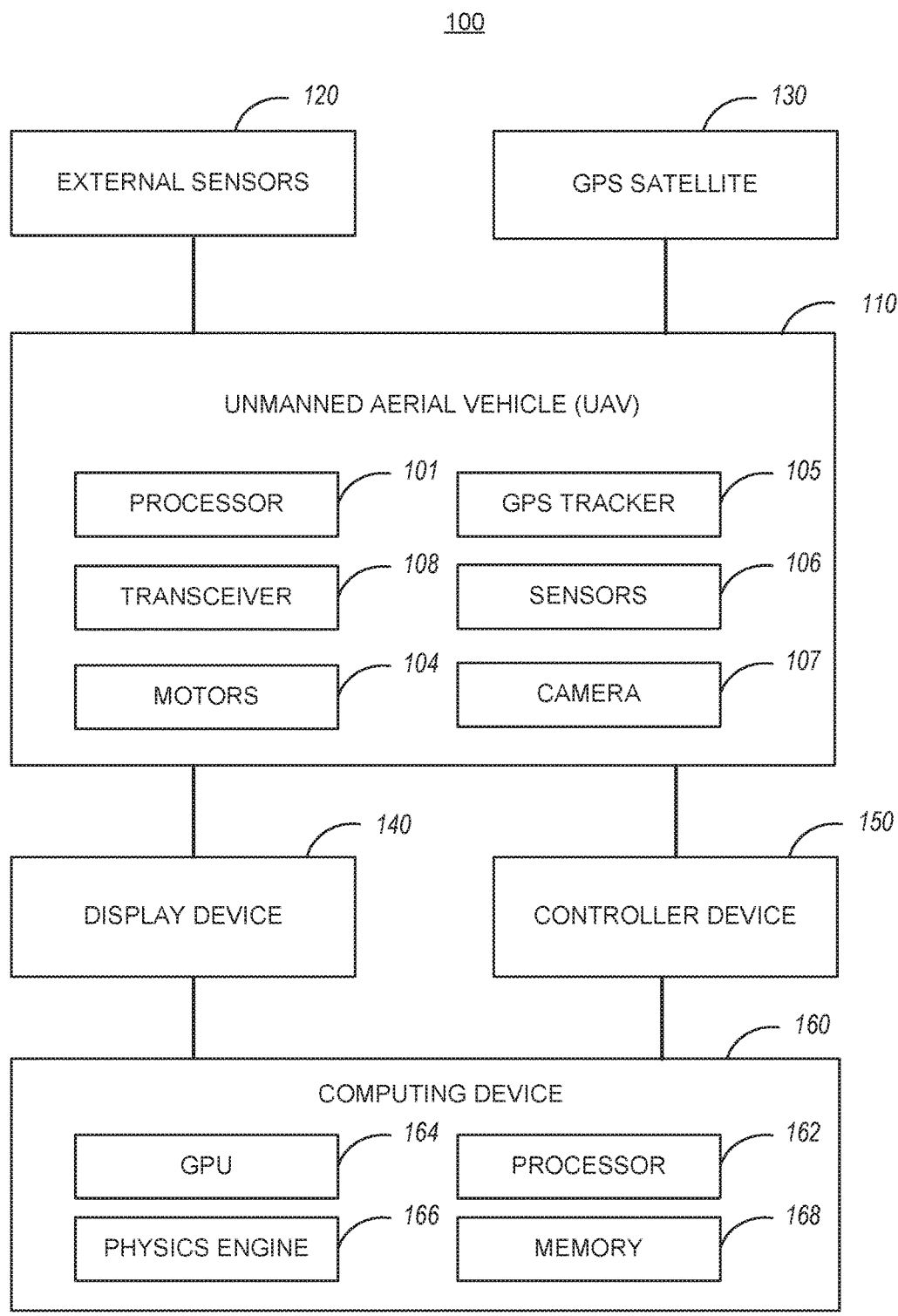
FIG. 1 illustrates a block diagram of an example steering assist system.

FIG. 1 illustrates a block diagram of an example steering assist system 100. The steering assist system 100 can include an unmanned aerial vehicle (UAV) 110, a computing device 160, a controller device 150, and a display device 140. It is understood that the computing device 160, the controller device 150, and the display device 140 can be integrated into a single device or multiple connected devices. Similarly, the UAV 110 and the computing device 160 can be integrated into a single device or multiple connected devices.

A user of the controller device 150 is in control of flight by the UAV 110 while the steering assist system 100 provides navigation suggestions to the user in real-time. In some implementations, the steering assist system 100 can take control away from the user of the controller 150 to execute the navigation suggestions.

The computing device 160 can be a personal computer, a laptop, a smart phone, tablet, a server, a mobile device, a game console system, or other such device. The computing device includes a processor 162, a graphics processing unit (GPU) 164, a physics engine 166, and a memory 168. It is understood that one or more of the processor 162, the GPU 164, the physics engine 166, or the memory 168 can be integrated into a single unit or exist as separate units.

The UAV 110 can include a processor 101, motors 104, a global positioning system (GPS) tracker 105, various sensors 106, one or more cameras 107, and a transceiver 108.

In some implementations, the controller device 150 and/or display device 140 can include a personal computer, a laptop, a smart phone, tablet, a server, a mobile device, a game controller, a game console, a television, or other such device. In some implementations, the display device is a head-mounted display (HMD) such as a virtual reality HMD or an augmented reality (AR) HMD. The VR HMD allows a user of to adjust a camera viewing angle or position in a virtual space by moving or rotating his head in the physical space. The AR HMD places images of both the physical world and virtual objects over the user's field of view.

The display device 140 displays visual information to the user. For example, the display device 140 can display a livestream of first person view of the UAV 110 from a camera on the UAV 110. The display device 140 can also display battery life remaining, speed, altitude, distance traveled, position of the UAV 107, wind conditions, connection signal strength, etc. to the user. In some implementations, the display device 140 indicates to the user when the steering assist system 100 takes over control of the UAV 110.

The user operates the controller device 150 to control the UAV 110 during normal operation. The controller device 150 can include one or more analog or digital input options. Analog input options include flight stick or joystick controls, triggers, sliders, throttles, dials, etc. Digital input options include buttons, switches, etc.

The steering assist system 100 receives physical space data for a flight area. The physical space data refers to any data that helps the steering assist system 100 map out the flight area.

In some implementations, the physical space data includes pre-mapped data for the flight area. For example the pre-mapped data can be uploaded by the user to the steering assist system 100 prior to flight. In another example, the pre-mapped data can be downloaded from an online database.

In some implementations, the steering assist system 100 receives the physical space data in real-time and includes sensor data from the sensors 106 on the UAV and/or external sensors 120 placed around the flight area. In some implementations, the steering assist system 100 creates the virtual world in real-time using simultaneous localization and mapping (SLAM). SLAM relates to the computational problem of constructing or updating a map of an unknown environment while simultaneously keeping track of an agent's location within it.

The steering assist system 100 creates a virtual world model to represent the flight area. The steering assist system 100 creates the virtual world model by mapping the physical space data with a physics engine 166. The steering assist system 100 additionally creates a virtual UAV model to represent the UAV in the virtual world model.

The physics engine 166 creates a three-dimensional mesh representing a virtual world. A mesh is a collection of vertices, edges and faces that defines the shape of a polyhedral object for use in three-dimensional modeling. The faces usually include triangles, quadrilaterals, or other simple convex polygons, but can also include more general concave polygons, or polygons with holes. A vertex is a position (usually in 3D space) along with other information such as color, normal vector and texture coordinates. An edge is a connection between two vertices. A face is a closed set of edges (e.g., a triangle face has tree edges and a quad face has four edges).

Polygon meshes may be represented in a variety of ways, using different methods to store the vertex, edge and face data. Examples of polygon mesh representations include Face-vertex meshes, Winged-edge meshes, Half-edge meshes, Quad-edge meshes, Corner-table meshes, and Vertex-vertex meshes.

The physics engine 166 includes one or more computer programs and/or algorithms that simulate or model the motion of an object under physical laws of the real world. The physics engine 166 uses equations incorporating variables such as mass, position information, velocity, forces, engine constraints and others in performing the simulation. The simulation provides a representation of an interaction in the virtual world model for the virtual UAV model.

The physics engine 166 simulates physical phenomena though the use of rigid body dynamics, soft body dynamics and/or fluid dynamics principles. The physics engine 166 includes collision detection system, which seeks to detect when objects in a virtual environment collide with one another. Typically, simulation and display operations are performed several times a second. Each simulation and display operation occurs during a time step described as a frame.

Thus, the physics engine 166 can be implemented using an API, middleware, or other computer software implementation. While the physics engine 166 is running, during a given frame, the physics engine 166 steps forward in time and simulates any interaction outcomes during the next time step and then output the results.

The steering assist system 100 determines capability parameters of the UAV. The capability parameters include at least one of maximum speed, maximum acceleration, maximum deceleration, or turning rate. In some implementations, the capability parameters of the UAV 110 are known and stored in the memory 168. In some other implementations, the capability parameters can be downloaded from an online database. In some implementations, the steering assist system 100 can perform a flight test on the UAV 110 to determine the capability parameters.

The steering assist system 100 receives flight data for the UAV 110, as it flies along a flight path and performs maneuvers, from the sensors 106. The sensors 106 can include at least one of a camera, an infra-red (IR) sensor, a Light Detection and Ranging (LiDAR) sensor, a proximity sensor, a radar, a sonar sensor, or other such sensors. In some implementations, the flight data includes controller inputs from a controller device.

The steering assist system 100 determines a current position of the virtual UAV model in the virtual world model. In some implementations, the steering assist system 100 determines the position of the position of the UAV 110 in the real world using the GPS tracker 105 which connects to a GPS satellite.

The steering assist system 100 determines a predicted trajectory of the virtual UAV model within the virtual world model. In some implementations, the steering assist system 100 determines the position of the UAV 110 in the real world using external sensors 120 that track the UAV's position, such as cameras, sonar sensors, or LiDAR sensors placed around the flight area. In some implementations, the steering assist system 100 determines the current position of UAV 110 using the flight data and correspondingly updates the current position of the virtual UAV model in the virtual world model.

In some implementations, determining the predicted trajectory of the UAV comprises an inertial navigation system (INS) using a dead reckoning algorithm to calculate the current position of the UAV. An INS is a navigation aid that uses sensors such as motion sensors (accelerometers) and rotation sensors (gyroscopes) to continuously calculate via dead reckoning the position, orientation, and velocity (direction and speed of movement) of a moving object without the need for external references. In some implementations, the steering assist system 100 receives sensor data from one or more sensors 106 on the UAV 110, as it flies. The sensors 106 can include cameras, accelerometers, gyroscopes, distance sensors, Light Detection and Ranging sensors, or other such sensor.

Inertial navigation is a self-contained navigation technique in which measurements provided by accelerometers and gyroscopes are used to track the position and orientation of an object relative to a known starting point, orientation and velocity. Inertial measurement units (IMUs) typically contain three orthogonal rate-gyroscopes and three orthogonal accelerometers, measuring angular velocity and linear acceleration respectively. By processing signals from these devices it is possible to predict the position and orientation of the UAV 110.

Gyroscopes measure the angular velocity of the sensor frame with respect to the inertial reference frame. By using the original orientation of the system in the inertial reference frame as the initial condition and integrating the angular velocity, the system's current orientation is known at all times. Accelerometers measure the linear acceleration of the moving vehicle in the sensor or body frame, but in directions that can only be measured relative to the moving.

The inertial navigation system suffer from integration drift, which are small errors in the measurement of acceleration and angular velocity are integrated into progressively larger errors in velocity, which are compounded into still greater errors in position. Since the new position is calculated from the previous calculated position and the measured acceleration and angular velocity, these errors accumulate roughly proportionally to the time since the initial position was input.

The steering assist system 100 then determines a navigation suggestion for the UAV based on the predicted trajectory and capability parameters for the UAV 110. In some implementations, the navigation suggestion is for a flight path of the UAV 110 that is faster through the virtual world model of the flight area than the predicted trajectory. In some implementations, the steering assist system 100 updates the navigation suggestion in real time, based on the current speed and direction of the UAV 110 as modeled by the virtual UAV model, in relation to the virtual world model of the flight area.

In some implementations, the navigation suggestion is for a flight path of the UAV 110 that also avoids collision with an income obstacle. In some implementations, the physics engine 166 includes a collision detector which generates contact points between an object pair, such as two rigid bodies. The physics engine 166 determines whether any of the objects in the virtual world model are colliding or overlapping. This is accomplished using a collision detection system. The primary focus of the collision detection system is to calculate all collision information between all bodies in a scene.

The physics engine 166 calculates constraints, which are restrictions on the freedom of movement of objects, allowing the creation of complex systems such as hinges, body joints, and wheels. A constraint between two bodies restricts the movement for a those bodies in a certain way. An unconstrained body has 6 degrees of freedom (3 linear and 3 angular). At any given time, a constraint removes certain degrees of freedom of one body relative to another. For example, if two bodies are constrained by a hinge, all linear degrees of freedom at the point of constraint, and two angular degrees of freedom are removed. As a result, the constraint only allows the bodies to rotate in one axis relative to each other. Such a constraint is bilateral, in that the bodies may not violate the constraint in either direction.

A contact between two bodies can also be treated as a constraint, in that the bodies are constrained such that they may not move towards each other at the point of contact. This type of a constraint is a contact constraint. In a rigid body system, rigid bodies should not interpenetrate. This results in the effective removal of one linear degree of freedom in the direction of the normal of the contact. Contact constraints are unilateral, in that bodies in contact are only constrained not to move towards each other, movement apart is unconstrained.

The steering assist system 100 performs evasive actions by the UAV 110 based on the capability parameters of the UAV, in response to determining that the predicted trajectory will result in a collision. For example, the evasive actions may include overriding controller inputs from a controller device to control the UAV to perform braking or a banking maneuver by adjusting at least one of a roll, pitch, yaw, or throttle of the UAV to avoid an obstacle in the physical world.

The GPU 164 of the steering assist system 100 displays the navigation suggestion to the user on the display device 140. In some implementations, the GPU 164 displays a graphical user interface (GUI) on a head-mounted display (HMD).

In some implementations, the GPU 164 outputs a graphical representation of the UAV flight path corresponding to the selected section. For example, a playback device can display a trace of the flight path in a virtual space on the display device 140.

In some implementations, the GPU 164 can output a graphical representation of the controller inputs. For example, a playback device can display a two-dimensional or three-dimensional virtual model representation of a controller device that mimics the looks and control movement of the physical controller device 150. For example, the playback device can display joystick levers, buttons, sliders, etc. on the virtual model move according to the controller inputs as the physical controller device 150 would move. This allows a user viewing the playback device to learn the proper controller inputs to cause the UAV 170 to move according to the flight path and perform the same maneuvers.

In some implementations the steering assist system 100 overriding controller inputs from a controller device to control the UAV 110 to execute the navigation suggestion.

The GPU 164 can also or alternatively output a video playback of the virtual UAV model flown according to the navigation suggestion in a first-person view, a third person view, or a static camera view. The user can watch and rewatch a graphical representation of the UAV fly the flight path corresponding to the selected section.

Figure 2:
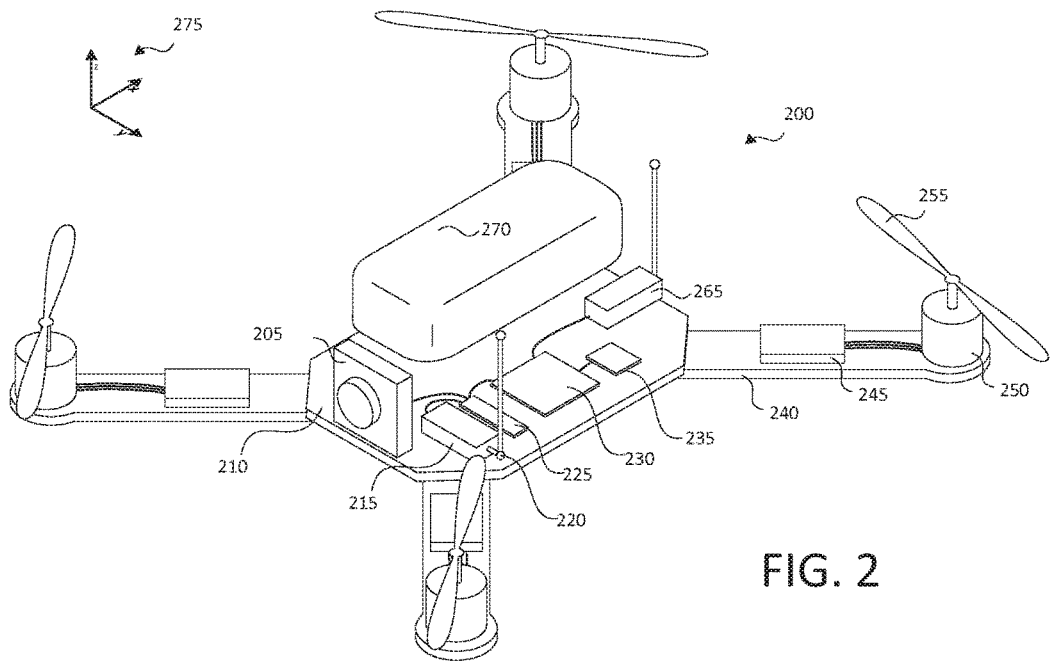
FIG. 2 illustrates an example unmanned aerial vehicle (UAV)

FIG. 2 shows unmanned aerial vehicle (UAV) 200 according to some embodiments. UAV 200 can have one or more motors 250 configured to rotate attached propellers 255 in order to control the position of UAV 200 in the air. UAV 200 can be configured as a fixed wing vehicle (e.g., airplane), a rotary vehicle (e.g., a helicopter or multirotor), or a blend of the two. For the purpose of FIG. 2, axes 275 can assist in the description of certain features. If UAV 200 is oriented parallel to the ground, the Z axis can be the axis perpendicular to the ground, the X axis can generally be the axis that passes through the bow and stern of UAV 200, and the Y axis can be the axis that pass through the port and starboard sides of UAV 200. Axes 275 are merely provided for convenience of the description herein.

In some embodiments, UAV 200 has main body 210 with one or more arms 240. The proximal end of arm 240 can attach to main body 210 while the distal end of arm 240 can secure motor 250. Arms 240 can be secured to main body 210 in an "X" configuration, an "H" configuration, a "T" configuration, or any other configuration as appropriate. The number of motors 250 can vary, for example there can be three motors 250 (e.g., a "tricopter"), four motors 250 (e.g., a "quadcopter"), eight motors (e.g., an "octocopter"), etc.

In some embodiments, each motor 255 rotates (i.e., the drive shaft of motor 255 spins) about parallel axes. For example, the thrust provided by all propellers 255 can be in the Z direction. Alternatively, a motor 255 can rotate about an axis that is perpendicular (or any angle that is not parallel) to the axis of rotation of another motor 255. For example, two motors 255 can be oriented to provide thrust in the Z direction (e.g., to be used in takeoff and landing) while two motors 255 can be oriented to provide thrust in the X direction (e.g., for normal flight). In some embodiments, UAV 200 can dynamically adjust the orientation of one or more of its motors 250 for vectored thrust.

In some embodiments, the rotation of motors 250 can be configured to create or minimize gyroscopic forces. For example, if there are an even number of motors 250, then half of the motors can be configured to rotate counter-clockwise while the other half can be configured to rotate clockwise. Alternating the placement of clockwise and counter-clockwise motors can increase stability and enable UAV 200 to rotate about the z-axis by providing more power to one set of motors 250 (e.g., those that rotate clockwise) while providing less power to the remaining motors (e.g., those that rotate counter-clockwise).

Motors 250 can be any combination of electric motors, internal combustion engines, turbines, rockets, etc. In some embodiments, a single motor 250 can drive multiple thrust components (e.g., propellers 255) on different parts of UAV 200 using chains, cables, gear assemblies, hydraulics, tubing (e.g., to guide an exhaust stream used for thrust), etc. to transfer the power.

In some embodiments, motor 250 is a brushless motor and can be connected to electronic speed controller 245. Electronic speed controller 245 can determine the orientation of magnets attached to a drive shaft within motor 250 and, based on the orientation, power electromagnets within motor 250. For example, electronic speed controller 245 can have three wires connected to motor 250, and electronic speed controller 245 can provide three phases of power to the electromagnets to spin the drive shaft in motor 250. Electronic speed controller 245 can determine the orientation of the drive shaft based on back-emf on the wires or by directly sensing to position of the drive shaft.

Transceiver 265 can receive control signals from a control unit (e.g., a handheld control transmitter, a server, etc.). Transceiver 265 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 265 can also transmit data to a control unit. Transceiver 265 can communicate with the control unit using lasers, light, ultrasonic, infra-red, Bluetooth, 802.11x, or similar communication methods, including a combination of methods. Transceiver can communicate with multiple control units at a time.

Position sensor 235 can include an inertial measurement unit for determining the acceleration and/or the angular rate of UAV 200, a GPS receiver for determining the geolocation and altitude of UAV 200, a magnetometer for determining the surrounding magnetic fields of UAV 200 (for informing the heading and orientation of UAV 200), a barometer for determining the altitude of UAV 200, etc. Position sensor 235 can include a land-speed sensor, an air-speed sensor, a celestial navigation sensor, etc.

UAV 200 can have one or more environmental awareness sensors. These sensors can use sonar, LiDAR, stereoscopic imaging, computer vision, etc. to detect obstacles and determine the nearby environment. For example, a steering assist system can use environmental awareness sensors to determine how far away an obstacle is and, if necessary, change course.

Position sensor 235 and environmental awareness sensors can all be one unit or a collection of units. In some embodiments, some features of position sensor 235 and/or the environmental awareness sensors are embedded within flight controller 230.

In some embodiments, an environmental awareness system can take inputs from position sensors 235, environmental awareness sensors, databases (e.g., a predefined mapping of a region) to determine the location of UAV 200, obstacles, and pathways. In some embodiments, this environmental awareness system is located entirely on UAV 200, alternatively, some data processing can be performed external to UAV 200.

Camera 205 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 205 is part of a camera system which includes multiple cameras 205. For example, two cameras 205 can be used for stereoscopic imaging (e.g., for first person video, augmented reality, etc.). Another example includes one camera 205 that is optimized for detecting hue and saturation information and a second camera 205 that is optimized for detecting intensity information. In some embodiments, camera 205 optimized for low latency is used for control systems while a camera 205 optimized for quality is used for recording a video (e.g., a cinematic video). Camera 205 can be a visual light camera, an infrared camera, a depth camera, etc.

A gimbal and dampeners can help stabilize camera 205 and remove erratic rotations and translations of UAV 200. For example, a three-axis gimbal can have three stepper motors that are positioned based on a gyroscope reading in order to prevent erratic spinning and/or keep camera 205 level with the ground.

Video processor 225 can process a video signal from camera 205. For example video process 225 can enhance the image of the video signal, down-sample or up-sample the resolution of the video signal, add audio (captured by a microphone) to the video signal, overlay information (e.g., flight data from flight controller 230 and/or position sensor), convert the signal between forms or formats, etc.

Video transmitter 220 can receive a video signal from video processor 225 and transmit it using an attached antenna. The antenna can be a cloverleaf antenna or a linear antenna. In some embodiments, video transmitter 220 uses a different frequency or band than transceiver 265. In some embodiments, video transmitter 220 and transceiver 265 are part of a single transceiver.

Battery 270 can supply power to the components of UAV 200. A battery elimination circuit can convert the voltage from battery 270 to a desired voltage (e.g., convert 12 v from battery 270 to 5 v for flight controller 230). A battery elimination circuit can also filter the power in order to minimize noise in the power lines (e.g., to prevent interference in transceiver 265 and transceiver 220). Electronic speed controller 245 can contain a battery elimination circuit. For example, battery 270 can supply 12 volts to electronic speed controller 245 which can then provide 5 volts to flight controller 230. In some embodiments, a power distribution board can allow each electronic speed controller (and other devices) to connect directly to the battery.

In some embodiments, battery 270 is a multi-cell (e.g., 2 S, 3 S, 4 S, etc.) lithium polymer battery. Battery 270 can also be a lithium-ion, lead-acid, nickel-cadmium, or alkaline battery. Other battery types and variants can be used as known in the art. Additional or alternative to battery 270, other energy sources can be used. For example, UAV 200 can use solar panels, wireless power transfer, a tethered power cable (e.g., from a ground station or another UAV 200), etc. In some embodiments, the other energy source can be utilized to charge battery 270 while in flight or on the ground.

Battery 270 can be securely mounted to main body 210. Alternatively, battery 270 can have a release mechanism. In some embodiments, battery 270 can be automatically replaced. For example, UAV 200 can land on a docking station and the docking station can automatically remove a discharged battery 270 and insert a charged battery 270. In some embodiments, UAV 200 can pass through docking station and replace battery 270 without stopping.

Battery 270 can include a temperature sensor for overload prevention. For example, when charging, the rate of charge can be thermally limited (the rate will decrease if the temperature exceeds a certain threshold). Similarly, the power delivery at electronic speed controllers 245 can be thermally limited—providing less power when the temperature exceeds a certain threshold. Battery 270 can include a charging and voltage protection circuit to safely charge battery 270 and prevent its voltage from going above or below a certain range.

UAV 200 can include a location transponder. For example, in a racing environment, race officials can track UAV 200 using location transponder. The actual location (e.g., X, Y, and Z) can be tracked using triangulation of the transponder. In some embodiments, gates or sensors in a track can determine if the location transponder has passed by or through the sensor or gate.

Flight controller 230 can communicate with electronic speed controller 245, battery 270, transceiver 265, video processor 225, position sensor 235, and/or any other component of UAV 200. In some embodiments, flight controller 230 can receive various inputs (including historical data) and calculate current flight characteristics. Flight characteristics can include an actual or predicted position, orientation, velocity, angular momentum, acceleration, battery capacity, temperature, etc. of UAV 200. Flight controller 230 can then take the control signals from transceiver 265 and calculate target flight characteristics. For example, target flight characteristics might include "rotate×degrees" or "go to this GPS location". Flight controller 230 can calculate response characteristics of UAV 200. Response characteristics can include how electronic speed controller 245, motor 250, propeller 255, etc. respond, or are expected to respond, to control signals from flight controller 230. Response characteristics can include an expectation for how UAV 200 as a system will respond to control signals from flight controller 230. For example, response characteristics can include a determination that one motor 250 is slightly weaker than other motors.

After calculating current flight characteristics, target flight characteristics, and response characteristics flight controller 230 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 230 are performed by a system external to UAV 200. For example, current flight characteristics can be sent to a server that returns the optimized control signals. Flight controller 230 can send the optimized control signals to electronic speed controllers 245 to control UAV 200.

In some embodiments, UAV 200 has various outputs that are not part of the flight control system. For example, UAV 200 can have a loudspeaker for communicating with people or other UAVs 200. Similarly, UAV 200 can have a flashlight or laser. The laser can be used to "tag" another UAV 200.

Figure 3:
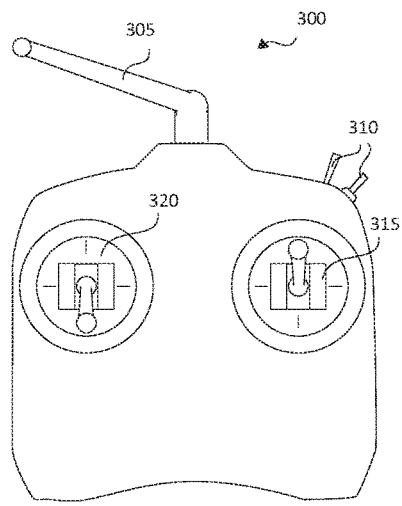
FIG. 3 illustrates an example controller device.

FIG. 3 shows control transmitter 300 according to some embodiments. Control transmitter 300 can send control signals to transceiver 265. Control transmitter can have auxiliary switches 310, joysticks 315 and 320, and antenna 305. Joystick 315 can be configured to send elevator and aileron control signals while joystick 320 can be configured to send throttle and rudder control signals (this is termed a mode 2 configuration). Alternatively, joystick 315 can be configured to send throttle and aileron control signals while joystick 320 can be configured to send elevator and rudder control signals (this is termed a mode 1 configuration). Auxiliary switches 310 can be configured to set options on control transmitter 300 or UAV 200. In some embodiments, control transmitter 300 receives information from a transceiver on UAV 200. For example, it can receive some current flight characteristics from UAV 200.

Figure 4:
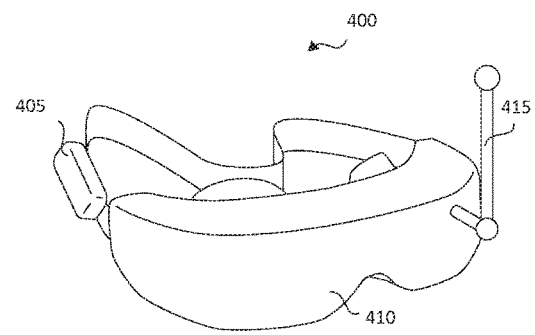
FIG. 4 illustrates an example head-mounted display (HMD)

FIG. 4 shows display 400 according to some embodiments. Display 400 can include battery 405 or another power source, display screen 410, and receiver 415. Display 400 can receive a video stream from transmitter 220 from UAV 200. Display 400 can be a head-mounted unit as depicted in FIG. 4. Display 400 can be a monitor such that multiple viewers can view a single screen. In some embodiments, display screen 410 includes two screens, one for each eye; these screens can have separate signals for stereoscopic viewing. In some embodiments, receiver 415 is mounted on display 4100 (as should in FIG. 4), alternatively, receiver 415 can be a separate unit that is connected using a wire to display 400. In some embodiments, display 400 is mounted on control transmitter 300.

Figure 5:
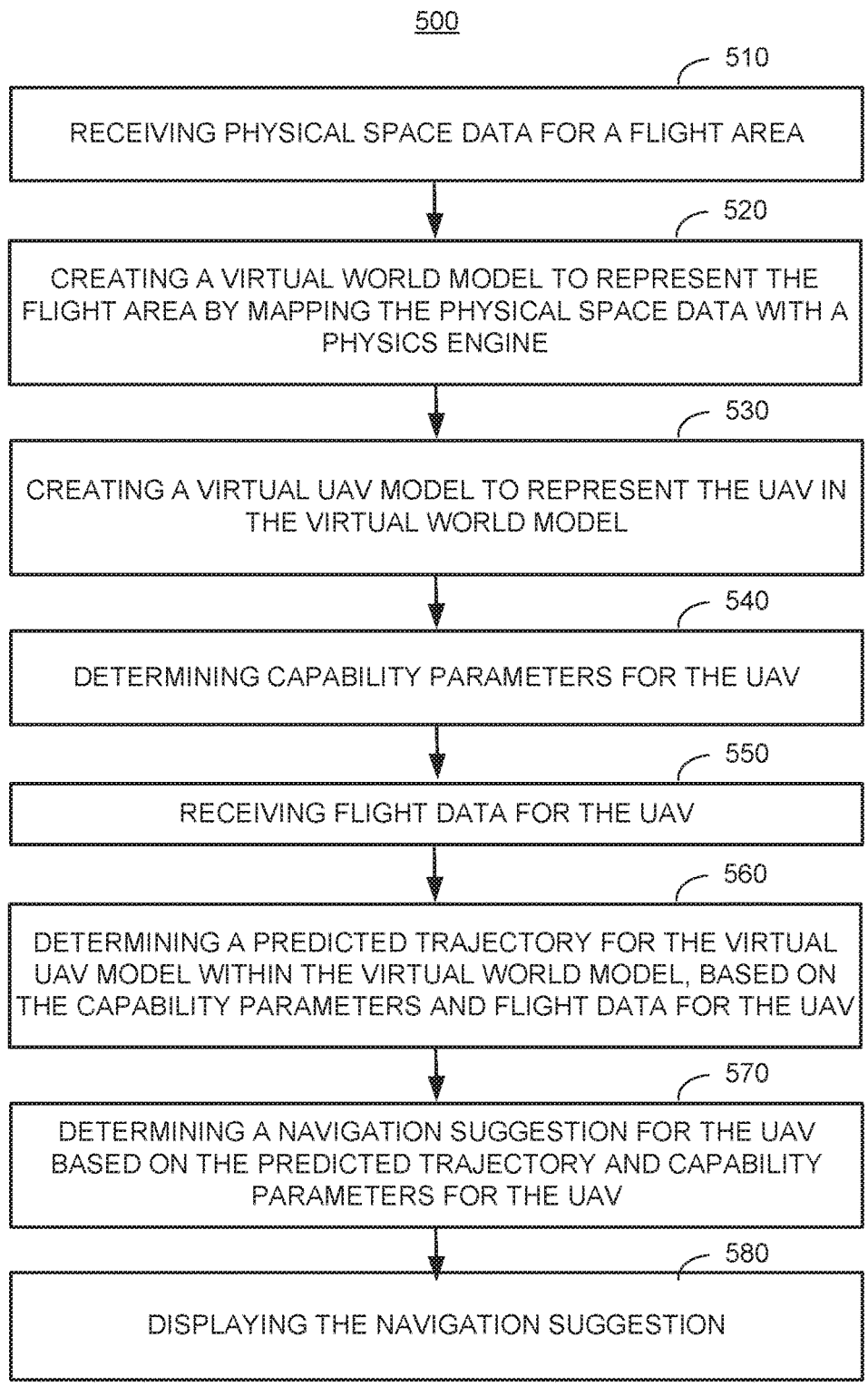
FIG. 5 illustrates an example methodology for managing flight paths for an unmanned aerial vehicle (UAV)

FIG. 5 illustrates an example methodology 500 by a steering assist system for an unmanned aerial vehicle (UAV). At step 510, the steering assist system receives physical space data for a flight area. In some implementations, the physical space data comprises pre-mapped data for the flight area. In some implementations, receiving physical space data comprises receiving, in real-time, sensor data from at least one sensor on the UAV. In some implementations, the at least one sensor comprises at least one of a camera, an infra-red (IR) sensor, a Light Detection and Ranging (LiDAR) sensor, a proximity sensor, a radar, or a sonar sensor.

At step 520, the steering assist system creates a virtual world model to represent the flight area by mapping the physical space data with a physics engine. In some implementations, creating the virtual world model occurs in real-time and uses simultaneous localization and mapping (SLAM).

At step 530, the steering assist system creates a virtual UAV model to represent the UAV in the virtual world model.

At step 540, the steering assist system determines capability parameters of the UAV. In some implementations, capability parameters include at least one of maximum speed, maximum acceleration, maximum deceleration, or turning rate.

At step 550, the steering assist system receives flight data for the UAV. In some implementations, the flight data comprises sensor data from at least one sensor on the UAV. In some implementations, the sensor data comprises at least one of speed, altitude, direction, wind speed, wind direction. In some implementations, the flight data comprises controller inputs from a controller device.

At step 560, the steering assist system determines a predicted trajectory for the virtual UAV model within the virtual world model, based on the capability parameters and flight data for the UAV.

At step 570, the steering assist system determines a navigation suggestion for the UAV based on the predicted trajectory and capability parameters for the UAV.

At step 580, the steering assist system displays the navigation suggestion.

Figure 6:
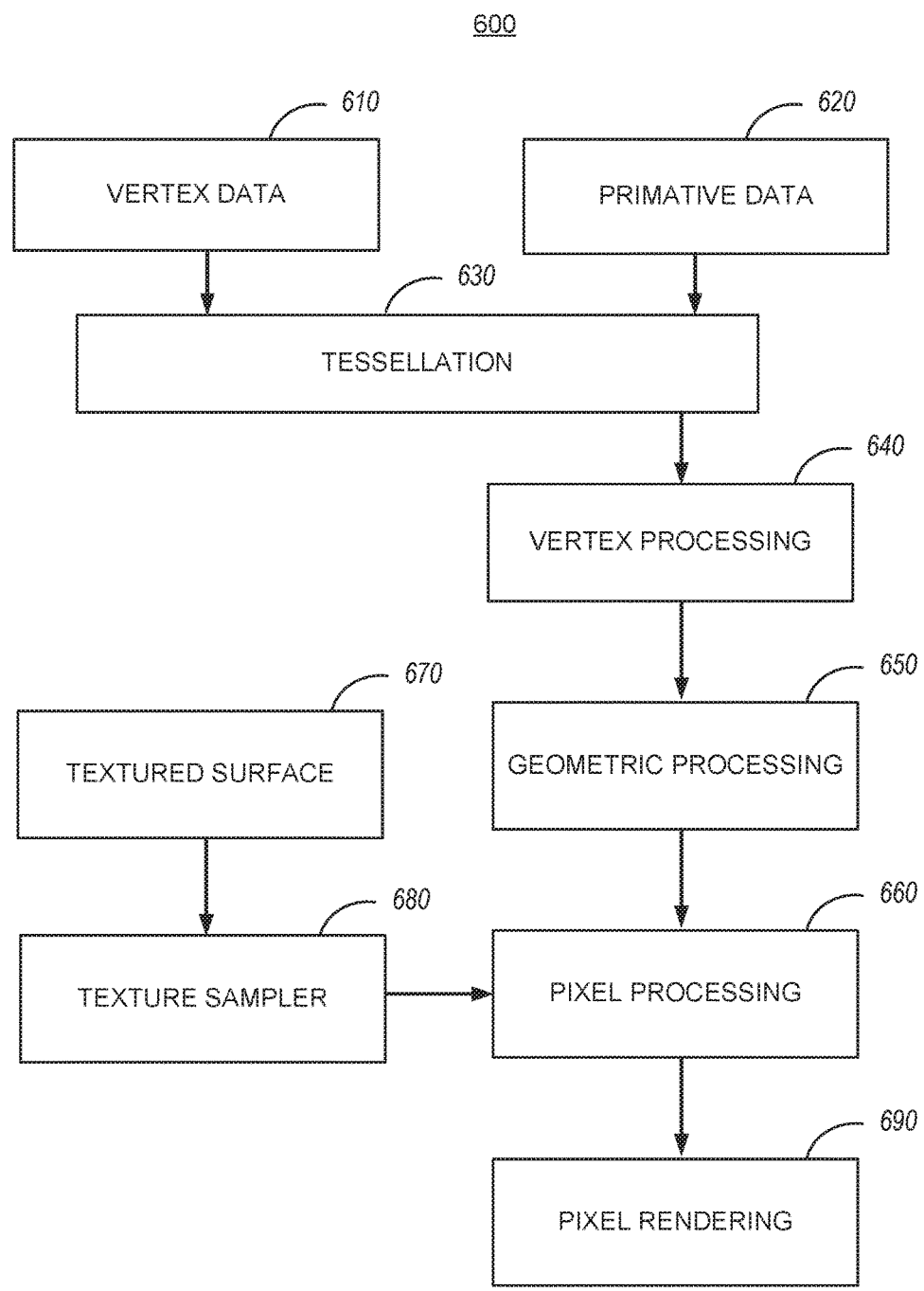
FIG. 6 illustrates a flow diagram of an example graphics pipeline in the prior art.

FIG. 6 illustrates a flow diagram 600 of an example graphics pipeline in the prior art. The graphical user interface uses a graphics pipeline or rendering pipeline to create a two-dimensional representation of a three-dimensional scene. For example, OpenGL and DirectX are two of the most commonly used graphics pipelines.

Stages of the graphics pipeline include creating a scene out of geometric primitives (i.e., simple geometric objects such as points or straight line segments). Traditionally this is done using triangles, which are particularly well suited to this as they always exist on a single plane. The graphics pipeline transforms form a local coordinate system to a three-dimensional world coordinate system. A model of an object in abstract is placed in the coordinate system of the three-dimensional world. Then the graphics pipeline transforms the three-dimensional world coordinate system into a three-dimensional camera coordinate system, with the camera as the origin.

The graphics pipeline then creates lighting, illuminating according to lighting and reflectance. The graphics pipeline then performs projection transformation to transform the three-dimensional world coordinates into a two-dimensional view of a two-dimensional camera. In the case of a perspective projection, objects which are distant from the camera are made smaller. Geometric primitives that now fall completely outside of the viewing frustum will not be visible and are discarded.

Next the graphics pipe performs rasterization. Rasterization is the process by which the two-dimensional image space representation of the scene is converted into raster format and the correct resulting pixel values are determined. From now on, operations will be carried out on each single pixel. This stage is rather complex, involving multiple steps often referred as a group under the name of pixel pipeline.

In some implementations, the graphical user interface performs projecting and rasterizing based on the virtual camera. For example, each pixel in the image can be determined during the rasterizing to create the two-dimensional image. This two-dimensional image can then be displayed.

Lastly, the graphics pipeline assigns individual fragments (or pre-pixels) a color based on values interpolated from the vertices during rasterization, from a texture in memory, or from a shader program. A shader program calculates appropriate levels of color within an image, produce special effects, and perform video post-processing. Shader programs calculate rendering effects on graphics hardware with a high degree of flexibility. Most shader programs use a graphics processing unit (GPU).

In the example graphics pipeline show in FIG. 6, at step 610 untransformed model vertices are stored in vertex memory buffers. At step 620 geometric primitives, including points, lines, triangles, and polygons, are referenced in the vertex data with index buffers. At step 630, tessellation converts higher-order primitives, displacement maps, and mesh patches to vertex locations and stores those locations in vertex buffers. At step 640, transformations are applied to vertices stored in the vertex buffer. At step 650, clipping, back face culling, attribute evaluation, and rasterization are applied to the transformed vertices. At step 660, Pixel shader operations use geometry data to modify input vertex and texture data, yielding output pixel color values. At step 670, texture coordinates are supplied. At step 680 texture level-of-detail filtering is applied to input texture values. At step 690 final rendering processes modify pixel color values with alpha, depth, or stencil testing, or by applying alpha blending or fog.

Figure 7:
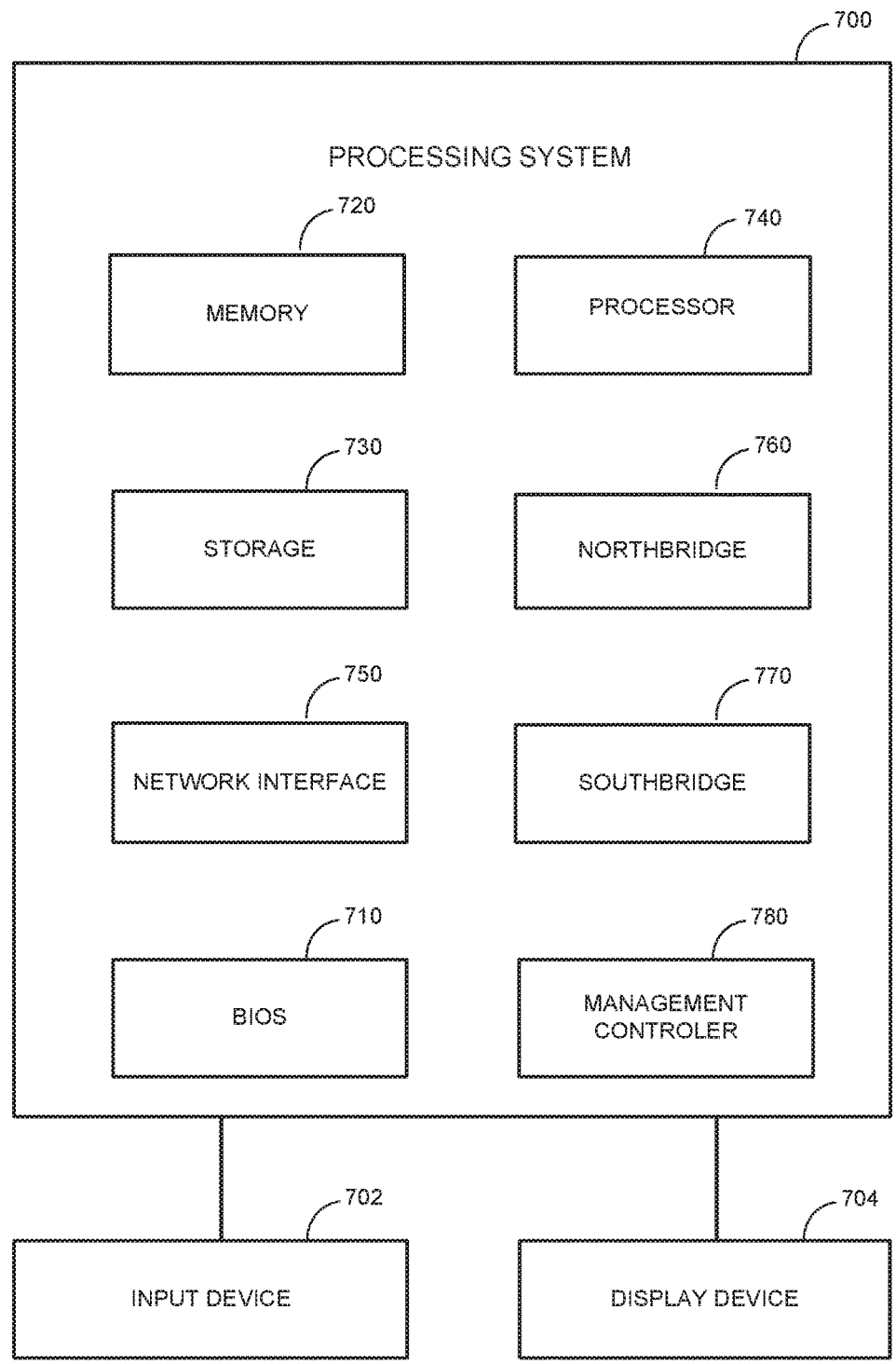
FIG. 7 illustrates a block diagram of an example computer system.

FIG. 7 illustrates a block diagram of an example processing system 700. The processing system 700 can include a processor 740, a network interface 750, a management controller 780, a memory 720, a storage 730, a Basic Input/Output System (BIOS) 710, and a northbridge 760, and a southbridge 770.

The processing system 700 can be, for example, a server (e.g., one of many rack servers in a data center) or a personal computer. The processor (e.g., central processing unit (CPU)) 740 can be a chip on a motherboard that can retrieve and execute programming instructions stored in the memory 720. The processor 740 can be a single CPU with a single processing core, a single CPU with multiple processing cores, or multiple CPUs. One or more buses (not shown) can transmit instructions and application data between various computer components such as the processor 740, memory 720, storage 730, and networking interface 750.

The memory 720 can include any physical device used to temporarily or permanently store data or programs, such as various forms of random-access memory (RAM). The storage 730 can include any physical device for non-volatile data storage such as a HDD or a flash drive. The storage 730 can have a greater capacity than the memory 720 and can be more economical per unit of storage, but can also have slower transfer rates.

The BIOS 710 can include a Basic Input/Output System or its successors or equivalents, such as an Extensible Firmware Interface (EFI) or Unified Extensible Firmware Interface (UEFI). The BIOS 710 can include a BIOS chip located on a motherboard of the processing system 700 storing a BIOS software program. The BIOS 710 can store firmware executed when the computer system is first powered on along with a set of configurations specified for the BIOS 710. The BIOS firmware and BIOS configurations can be stored in a non-volatile memory (e.g., NVRAM) 712 or a ROM such as flash memory. Flash memory is a non-volatile computer storage medium that can be electronically erased and reprogrammed.

The BIOS 710 can be loaded and executed as a sequence program each time the processing system 700 is started. The BIOS 710 can recognize, initialize, and test hardware present in a given computing system based on the set of configurations. The BIOS 710 can perform self-test, such as a Power-on-Self-Test (POST), on the processing system 700. This self-test can test functionality of various hardware components such as hard disk drives, optical reading devices, cooling devices, memory modules, expansion cards and the like. The BIOS can address and allocate an area in the memory 720 in to store an operating system. The BIOS 710 can then give control of the computer system to the OS.

The BIOS 710 of the processing system 700 can include a BIOS configuration that defines how the BIOS 710 controls various hardware components in the processing system 700. The BIOS configuration can determine the order in which the various hardware components in the processing system 700 are started. The BIOS 710 can provide an interface (e.g., BIOS setup utility) that allows a variety of different parameters to be set, which can be different from parameters in a BIOS default configuration. For example, a user (e.g., an administrator) can use the BIOS 710 to specify dock and bus speeds, specify what peripherals are attached to the computer system, specify monitoring of health (e.g., fan speeds and CPU temperature limits), and specify a variety of other parameters that affect overall performance and power usage of the computer system.

The management controller 780 can be a specialized microcontroller embedded on the motherboard of the computer system. For example, the management controller 780 can be a BMC or a RMC. The management controller 780 can manage the interface between system management software and platform hardware. Different types of sensors built into the computer system can report to the management controller 780 on parameters such as temperature, cooling fan speeds, power status, operating system status, etc. The management controller 780 can monitor the sensors and have the ability to send alerts to an administrator via the network interface 750 if any of the parameters do not stay within preset limits, indicating a potential failure of the system. The administrator can also remotely communicate with the management controller 780 to take some corrective action such as resetting or power cycling the system to restore functionality.

The northbridge 760 can be a chip on the motherboard that can be directly connected to the processor 740 or can be integrated into the processor 740. In some instances, the northbridge 760 and the southbridge 770 can be combined into a single die. The northbridge 760 and the southbridge 770, manage communications between the processor 740 and other parts of the motherboard. The northbridge 760 can manage tasks that require higher performance than the southbridge 770. The northbridge 760 can manage communications between the processor 740, the memory 720, and video controllers (not shown). In some instances, the northbridge 760 can include a video controller.

The southbridge 770 can be a chip on the motherboard connected to the northbridge 760, but unlike the northbridge 760, is not directly connected to the processor 740. The southbridge 770 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing system 700. The southbridge 770 can be connected to or can include within the southbridge 770 the management controller 770, Direct Memory Access (DMAs) controllers, Programmable Interrupt Controllers (PICs), and a real-time clock.

The input device 702 can be at least one of a game controller, a joystick, a mouse, a keyboard, a touchscreen, a trackpad, or other similar control device. The input device 702 allows a user to provide input data to the processing system 700.

The display device 704 can be at least one of a monitor, a light-emitting display (LED) screen, a liquid crystal display (LCD) screen, a head mounted display (HMD), a virtual reality (VR) display, a augmented reality (AR) display, or other such output device. The display device 704 allows the processing system 700 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for a steering assist system of an unmanned aerial vehicle (UAV), the method comprising:
    receiving physical space data for a flight area;
    creating a virtual world model to represent the flight area by mapping the physical space data with a physics engine;
    creating a virtual UAV model to represent the UAV in the virtual world model;
    determining capability parameters for the UAV;
    receiving flight data for the UAV;
    determining a predicted trajectory for the virtual UAV model within the virtual world model, based on the capability parameters and the flight data for the UAV;
    determining a navigation suggestion for the UAV based on both the predicted trajectory and the capability parameters, wherein the navigation suggestion corresponds to evasive action along a different path than the predicted trajectory; displaying the navigation suggestion on a display screen in real-time; and
    receiving user inputs to follow the displayed navigation suggestion, wherein the user inputs maintain control of the UAV when the user inputs specify that the UAV take the evasive action along the different path an accordance with the navigation suggestion displayed on the display screen.

2. The method of claim 1, further comprising overriding controller inputs from a controller device to control the UAV to execute the evasive action.

3. The method of claim 1, wherein the physical space data comprises pre-mapped data for the flight area.

4. The method of claim 1, wherein the physical space data includes real-time sensor data from at least one sensor on the UAV.

5. The method of claim 4, wherein the at least one sensor comprises at least one of a camera, an infra-red (IR) sensor, a Light Detection and Ranging (LiDAR) sensor, a proximity sensor, a radar, or a sonar sensor.

6. The method of claim 1, wherein creating the virtual world model occurs in real-time and uses simultaneous localization and mapping (SLAM).

7. The method of claim 1, wherein the flight data includes sensor data from at least one sensor, the sensor data including at least one of speed, altitude, direction, wind speed, and wind direction.

8. The method of claim 1, wherein the flight data comprises controller inputs from a controller device.

9. The method of claim 1, wherein determining the predicted trajectory for the virtual UAV model is by an inertial navigation system (INS) using a dead reckoning algorithm to calculate the current position of the UAV.

10. The method of claim 1, wherein determining the navigation suggestion comprises calculating a faster possible trajectory for the flight area based on the predicted trajectory.

11. The method of claim 1, wherein the navigation suggestion is determined and updated in real-time.

12. The method of claim 1, wherein the capability parameters include at least one of maximum speed, maximum acceleration, maximum deceleration, or turning rate.

13. The method of claim 1, wherein the display screen is part of a head-mounted display (HMD), and wherein the navigation suggestion is displayed via a graphical user interface (GUI) of the HMD.

14. A system for assisted steering, comprising:
    a receiver module configured to:
        receive physical space data for a flight area; and
        receive flight data for the UAV;
    a processing module configured to:
        create a virtual world model to represent the flight area by mapping the physical space data with a physics engine;
        create a virtual UAV model to represent the UAV in the virtual world model;
        determine capability parameters for the UAV;
        determine a predicted trajectory for the virtual UAV model within the virtual world model, based on the capability parameters and the flight data for the UAV; and
        determine a navigation suggestion for the UAV based on both the predicted trajectory and the capability parameters, wherein the navigation suggestion corresponds to evasive action along a different path than the predicted trajectory;
    a display screen configured to display the navigation suggestion in real-time;
    a user interface that receives user inputs to follow the displayed navigation suggestion, wherein the user inputs maintain control of the UAV when the user inputs specify that the UAV take the evasive action along the different path in accordance with the navigation suggestion that is displayed on the display screen; and
    a memory coupled to the processing module for storing data.

15. The system of claim 14, wherein the physical space data comprises pre-mapped data for the flight area.

16. The system of claim 14, wherein the physical space data includes real-time sensor data from at least one sensor on the UAV.

17. The system of claim 14, wherein the flight data comprises sensor data from at least one sensor on the UAV.

18. The system of claim 14, wherein determining the predicted trajectory for the virtual UAV model comprises an inertial navigation system (INS) using a dead reckoning algorithm to calculate the current position of the UAV.

19. A non-transitory computer-readable storage medium, having embodied thereon a program executable by a processor to perform a method for a steering assist system of an unmanned aerial vehicle (UAV), the method comprising:
receiving physical space data for a flight area;
creating a virtual world model to represent the flight area by mapping the physical space data with a physics engine;
creating a virtual UAV model to represent the UAV in the virtual world model;
determining capability parameters for the UAV;
receiving flight data for the UAV;
determining a predicted trajectory for the virtual UAV model within the virtual world model, based on the capability parameters and the flight data for the UAV;
determining a navigation suggestion for the UAV based on both the predicted trajectory and the capability parameters, wherein the navigation suggestion corresponds to evasive action along a different path than the predicted trajectory; and
displaying the navigation suggestion in real-time; and
receiving user inputs to follow the displayed navigation suggestion, wherein the user inputs maintain control of the UAV when the user inputs specify that the UAV take the evasive action along the different path in accordance with the navigation suggestion that is displayed on the display screen.

20. The method of claim 1, wherein the predicted trajectory for the virtual UAV model is determined to result in a collision with an object in the virtual world, and wherein taking the evasive action along the different path of the navigation suggestion avoids the predicted collision.

21. The method of claim 1, wherein the navigation suggestion is displayed via a display device that includes an augmented reality display.

22. The method of claim 1, wherein the displayed navigation suggestion includes a graphical representation of one or more controller inputs, and wherein the user command includes one or more corresponding controller inputs received at a controller device.

23. The method of claim 1, wherein the capability parameters further include one or more constraints that define a degree of freedom of movement by the UAV.

* * * * *